1,809,935

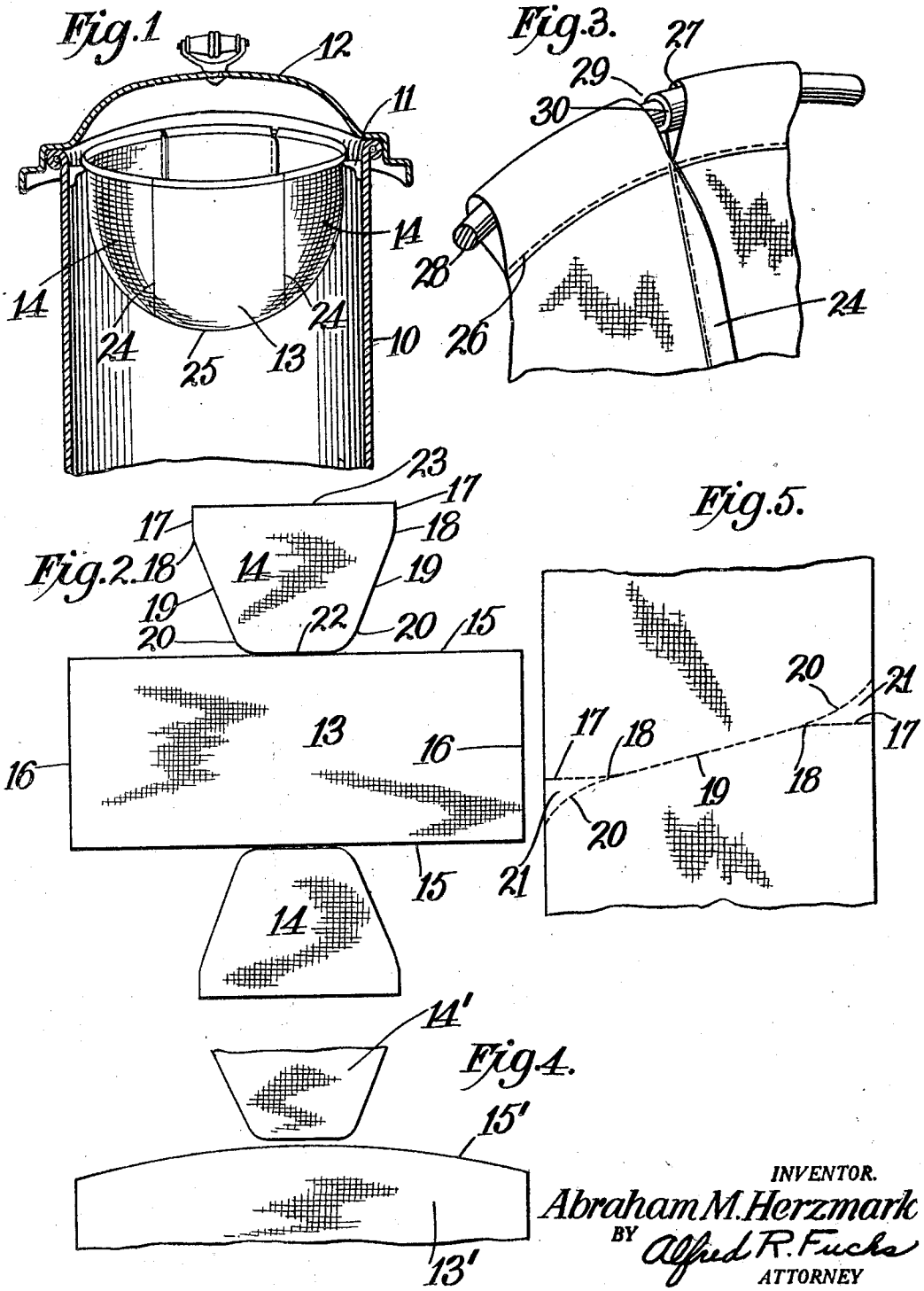
June 16, 1931. A. M. HERZMARK 1,809,935
COFFEE URN BAG
Filed July 30, 1928
INVENTOR.
Abraham M. Herzmark
BY Alfred R. Fuchs
ATTORNEY Patented June 16, 1931

UNITED STATES PATENT OFFICE

ABRAHAM M. HERZMARK, OF KANSAS CITY, MISSOURI

COFFEE URN BAG

Application filed July 30, 1928. Serial No. 296,275.

My invention relates to bags and more particularly to a coffee urn bag.

It is a purpose of my invention to provide a coffee urn bag that is so constructed that it requires less labor to make the same than such bags previously used, and so that the same is more easily cleaned when in use in the coffee urn. By reducing the amount of labor required to make the bag, the cost thereof is reduced. The labor is reduced, due to the smaller amount of seams required in constructing the bag.

It is a further purpose of the invention to provide a bag of the above mentioned character that is so shaped when distended by the coffee placed in the same that the bag will have a gradually rounded contour on the bottom thereof, thus providing more surface for the infusion of the coffee.

More specifically my improved coffee urn bag is made up in three sections, a center section and a pair of side sections, these are connected by means of seams that do not intersect with each other. By providing non-intersecting seams for securing the sections of the bag together, there are no pockets formed in the bag in which the ground coffee would collect and from which the same is difficult to remove in the ordinary coffee urn bag, thus making the bag more sanitary than ordinary coffee urn bags, because it can be cleaned thoroughly. The middle section is preferably made with straight side edges, although the same may be curved if desired to obtain the proper shape for the bag. The side sections are provided with curved edge portions. The curved edge portions of each section are united with a side edge of the center section by means of a continuous seam. The long straight edge portions of the side sections and the ends of the center section form the circumferential edge of the bag at the top thereof, and these edges are hemmed to provide a pocket for the reception of a ring ordinarily provided for stiffening said edge.

The curved edges of the side sections are not continuously curved on the same arc, but are provided with portions that are curved on an arc of relatively short radius and portions that are substantially straight, thus providing an edge that approximates a curve of the desired shape and makes it possible to save a maximum amount of material in cutting out the side sections.

Other objects and advantages of the invention will appear as the description of the drawings proceeds. I desire to have it understood, however, that I do not intend to limit myself to the particular details of construction described and shown in the drawings, but that I intend to include as part of my invention all such changes and modifications as would occur to a person skilled in this art, and as would fall within the scope of the claims.

In the drawings:

Fig. 1 is a perspective view of my improved coffee urn bag showing the same in association with an urn, the urn being partly broken away.

Fig. 2 is a diagrammatic plan view showing the relative position of the sections to each other, when assembled, but before stitching.

Fig. 3 is an enlarged fragmentary perspective view of the top portion of the bag.

Fig. 4 is a fragmentary view similar to Fig. 2 of a slight modification, and

Fig. 5 is a fragmentary plan view of a strip of the material from which the bags are made and illustrating the method of cutting the side sections to produce a minimum waste of material.

Referring in detail to the drawings, the improved urn bag is shown in Fig. 1 as being associated with a coffee urn 10 having a flange 11 for supporting the bag, adjacent the removable cover 12. The urn bag is made up of a central section 13 and the side sections 14, of suitable fabric material.

The central section 13 is preferably made rectangular although not necessarily so, and in Fig. 2 is shown as having the straight side edges 15 and the straight end edges 16. The side sections 14 have side edges provided with short straight substantially parallel portions 17, curved portions 18, substantially straight converging portions 19, and curved portions 20. The side edges of the members 14 thus approximate a smooth curve, but by providing the substantially straight converging portions 19, the amount of waste of the material from which the same are cut is reduced to a minimum.

Upon reference to Fig. 5 it will be seen that the adjacent side sections, as the same are cut from a length of material are reversed. The substantially straight portions 19 thus coincide on the two adjoining sections 14 and the only waste is the small triangular piece 21 at each side of the strip. This reduces the waste very materially from what it would be if darts were cut out of the pieces of material forming sections of the bag to shape the same, as has been previously necessary.

The curved edge portions 20 are connected by the straight edge portion 22 extending parallel to the longer straight edge 23. In assembling the parts the sections are united by means of seams that commence at one end of the side edge portions 15 of the central section 13 and run to the other end thereof. Each of these seams unites successively the edges 17, 18, 19, 20, 22, 20, 19, 18 and 17 of a side section 14 with the side edge 15 of the central section 13 adjacent thereto. The combined length of the edges 17, 18, 19, 20, 22, 20, 19, 18 and 17 is equal to the length of the side edge 15.

The two substantially straight smooth non-intersecting seams 24 are thus provided running across the bag and due to the shape of the side edges of the side pieces 14, the bag, when the proper amount of coffee is placed in the same will assume a contour such that the bottom 25 of the bag has a rounded form. A greater amount of surface for the infusion of the coffee is thus provided. The straight edges 23 of the side sections will then lie adjacent the end edges 16 of the central section and these are hemmed at 26 to provide the circumferentially extending pocket 27 in the top edge of the bag into which the usual stiffening wire 28 may be run through the gap at 29, the ends of the wire being connected together at 30 in any suitable and well known manner after insertion in the pocket 28.

In order to provide the gap at 29 to permit the starting of the hem 26 and the insertion of the ring 28, the one end of one seam 24 is not started at the corner where the edge 17 intersects the edge 23, but instead is begun inwardly thereof a short distance, the seam being begun substantially at the junction of the straight edge 17 with the curved edge 18 and leaving the edge portion 17 and a corresponding length of the edge portion 15 free to provide the gap at 29.

If it is found necessary to curve the side edges of the central section of the bag to obtain the desired shape thereof, this may be done as shown in Fig. 4 in which one side edge 15' of a central section 13' is shown as being curved, the opposite side edge being of course correspondingly curved. The side sections 14' are connected with the central section 13' in this form of the invention in the same manner as are the sections 14 with the section 13 in the previously described form.

It will be seen that a simple construction of bag is provided by the constructions described, that is cheap to make because of economy of labor and material, and that a sanitary article is provided in which there are no intersecting seams forming pockets in which the coffee can collect and is difficult to dislodge.

Having thus described my invention what I desire to claim and secure by United States Letters Patent is:

1. In a bag of the character described, a central section of substantially uniform width, a pair of similar uninterrupted side sections having curved edge portions engaging with the longitudinal edges of said central section, a pair of non-intersecting smooth continuous seams extending entirely across said bag and uniting the engaging edges of said sections to form a bag having a smooth rounded concavo-convex outline when distended and having no pocket forming recesses therein, and a peripheral seam at the top thereof, said bag being otherwise seamless.

2. In a bag of the character described, an elongated central section extending entirely across said bag and a pair of relatively short, tapering side sections having edge portions provided with curved portions, the edge portions of said side sections having the curved portions united with the longitudinal side edges of said central section by means of a pair of non-intersecting transverse seams to form a pocketless bag having a rounded contour providing a smooth rounded bottom for said bag when distended, the body portion of said bag having no other seams therein.

3. In a bag of the character described, an elongated central section extending entirely across said bag and having substantially parallel side edges, and a pair of similar side sections each having a short straight edge portion, curved edge portions and a longer straight edge portion, the side edges of said central section and the edges of the side sections comprising the curved edge portions and short straight edge portions united by a pair of transverse substantially parallel non-intersecting seams, and the end edges of said central section and the longer straight edges of the side sections being hemmed to provide a pocket lengthwise of the top edge of the bag, whereby a bag with a smooth concavo-convex form is provided, the body portion of said bag having no other seams therein.

In testimony whereof, I hereunto subscribe my name this 11th day of July, 1928.

ABRAHAM M. HERZMARK.